UNITED STATES PATENT OFFICE.

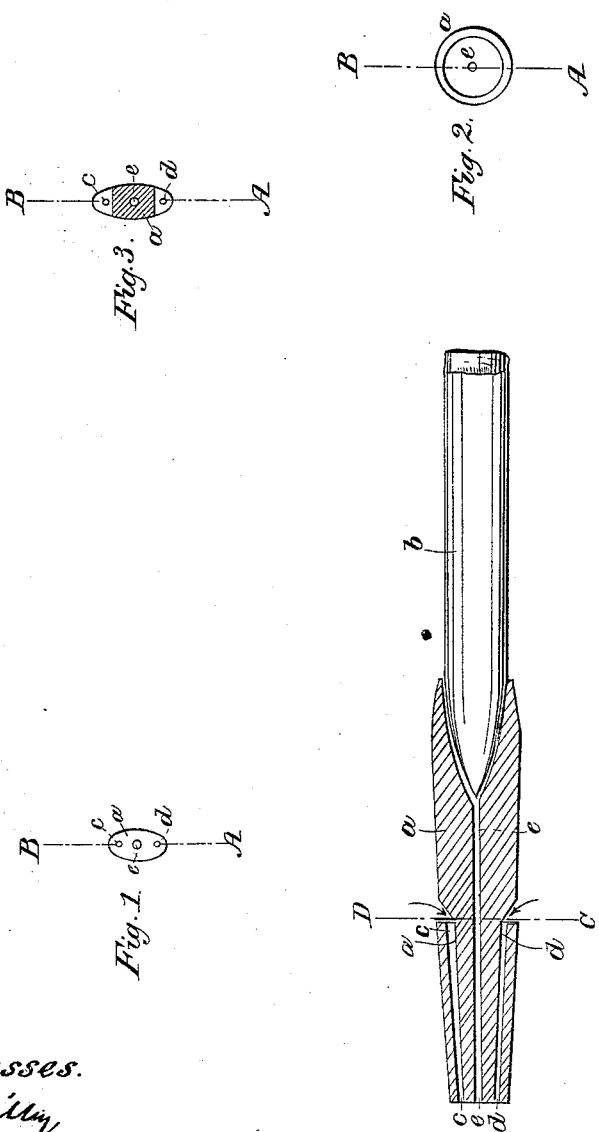

BENJ. S. STOKES, OF MANCHESTER, NEW HAMPSHIRE, ASSIGNOR TO HIMSELF AND WM. H. BURWICK, OF SAME PLACE.

IMPROVEMENT IN MOUTH-PIECES FOR CIGARS AND PIPES.

Specification forming part of Letters Patent No. 35,491, dated June 3, 1862.

*To all whom it may concern:*

Be it known that I, BENJAMIN S. STOKES, of Manchester, in the county of Hillsborough and State of New Hampshire, have invented a new and useful Improvement in Pipe and Cigar Holders, or Mouth-Pieces for Smoking Tobacco, which I call a "ventilating mouthpiece;" and I hereby declare that hereinafter is a full and exact description thereof, reference being had to the accompanying drawings, and to the letters of reference marked thereon, where similar parts are represented by like letters.

Figure 1 represents view of the mouth end of the cigar-holder; Fig. 2, of the cigar end of holder; Fig. 3, section on the line C D, Fig. 4; Fig. 4, longitudinal section on the line A B, Fig. 1, showing a cigar in place.

Various devices have been heretofore used for cooling the smoke of a cigar or pipe, in its passage to the mouth, by passing the smoke through a column of water or other liquid, one of which has been the subject of Letters Patent of the United States issued to James W. Evans, May 11, 1858; but all such contrivances have been expensive and cumbersome.

The object of my invention is to produce a cheap and portable mouth-piece that shall answer a better purpose than the class of inventions above alluded to, dispensing entirely with the use of water or other liquid substance.

I construct a mouth-piece to a cigar or pipe so that one or more currents of cold air are inhaled at the same time the smoke passes into the mouth, the object of these currents of air being to keep the mouth cool, and prevent that dry and parched condition of the mouth always produced by the hot smoke in the act of smoking. The desire to spit arising from the hot smoke is thus materially lessened, if not altogether removed, and thus one of the greater evils of smoking—expectoration—is overcome. Moreover, by using this ventilator, a cigar or pipe burns more slowly, and is longer in being consumed.

To enable others skilled in the art to make and use my invention, I will proceed to describe its construction.

First. I confine myself to the form of a mouth-piece for a cigar, as illustrated by the drawings. The mouth-piece $a$, Fig. 4, may be made, as heretofore, of any material, in one or more parts; but in addition to the common duct $e\ e$, Fig. 4, through which the smoke passes, I make one or more independent ducts, $c\ c$ and $d\ d$, Fig. 4, which are also shown by $c$ and $d$ in Figs. 1 and 2, for the passage of air only. These ducts $c$ and $d$, at one end, Fig. 1, open into the mouth, and their opposite ends terminate at any point beyond the place where the lips close around the mouth-piece, into the outer air, as in Fig. 4, near the red line C D. When $b$ is placed in $a$, and the mouth end of $a$ is inserted into the mouth, as the smoke is drawn from the lighted end of $b$ the air is at the same time drawn into the mouth through $c$ and $d$ in the direction indicated by the arrows, Fig. 4, for the purposes before specified. $c\ c$ and $d\ d$, Fig. 4, are made convergent toward the mouth end of $a$, so that the current of air passing through them intercept and cool the current of the smoke as it enters the mouth through $e\ e$, the three currents coming together as they enter the mouth; but I do not wish to confine myself to this particular method of constructing a cigar mouth-piece, as I contemplate the use of one or more air-ducts, as convenience or occasion may require.

Secondly. I construct the mouth end of a pipe-stem in the same manner, substantially making it a little wider than formerly, for a proper distance, so that one or more air-ducts may be made through the substance of the pipe, with one end opening into the mouth, and the other end of the air-duct opening into the outer air, substantially as described, and for the purposes above set forth, and I claim as a matter of actual experiment that a long-used and strong-scented pipe, that has become offensive, is made pleasant and agreeable by attaching a ventilating mouth-piece of my said invention thereto.

I also make portable mouth-pieces, adapted to pipes as well as cigars, in substantially the same manner, only varying the shape or form of the mouth-piece in such manner as to conveniently connect therewith the independent air-ducts heretofore described.

What I claim, and desire to secure by Letters Patent of the United States, is—

The construction, substantially as described, of ventilating mouth-pieces for cigars and pipes, so that one or more currents of cold air may be inhaled into the mouth at the same time the smoke is received through ducts independent of the smoke-duct, for the purposes herein set forth.

BENJAMIN S. STOKES.

Witnesses:
 JAMES O. ADAMS,
 B. P. CILLEY.